US010523550B2

(12) United States Patent
Ashwood-Smith et al.

(10) Patent No.: US 10,523,550 B2
(45) Date of Patent: Dec. 31, 2019

(54) SCOUT FUNCTIONS

(71) Applicants: Peter Ashwood-Smith, Gatineau (CA); Tao Wan, Ottawa (CA); Mehdi Arashmid Akhavain Mohammadi, Ottawa (CA)

(72) Inventors: Peter Ashwood-Smith, Gatineau (CA); Tao Wan, Ottawa (CA); Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 15/499,515

(22) Filed: Apr. 27, 2017

(65) Prior Publication Data
US 2018/0316591 A1   Nov. 1, 2018

(51) Int. Cl.
G06F 15/16 (2006.01)
H04L 12/26 (2006.01)
H04L 29/14 (2006.01)
H04L 29/08 (2006.01)

(52) U.S. Cl.
CPC .......... *H04L 43/14* (2013.01); *H04L 43/062* (2013.01); *H04L 43/065* (2013.01); *H04L 69/40* (2013.01); *H04L 67/1029* (2013.01)

(58) Field of Classification Search
CPC ..... H04L 43/062; H04L 43/065; H04L 43/14; H04L 67/10
See application file for complete search history.

(56) References Cited

U.S. PATENT DOCUMENTS

| | | | |
|---|---|---|---|
| 6,779,030 B1 * | 8/2004 | Dugan | H04M 3/42136 379/221.08 |
| 9,727,439 B2 * | 8/2017 | Mohammed | G06F 11/3476 |
| 9,958,291 B1 * | 5/2018 | Shunturov | G01D 4/002 |
| 2014/0372805 A1 * | 12/2014 | Rijnders | G06F 11/0793 714/37 |
| 2015/0117175 A1 * | 4/2015 | Dharmadhikari | H04L 41/0659 370/216 |
| 2015/0347264 A1 * | 12/2015 | Mohammed | G06F 11/3476 714/45 |
| 2016/0055045 A1 * | 2/2016 | Souza | G06F 11/0712 714/57 |

(Continued)

FOREIGN PATENT DOCUMENTS

CN    105760214 A    7/2016

OTHER PUBLICATIONS

Fabric, https://whatis.techtarget.com/definition/fabric, Techtarget. (Year: 2011).*

(Continued)

*Primary Examiner* — Moustafa M Meky
*Assistant Examiner* — Thorne E Waugh

(57) ABSTRACT

A controller and method for fault detection is provided in network cloud environments is provided. The controller may transmit a request to activate at least two scout functions at deployment locations in the network cloud environment, each scout function operable to execute one or more evaluation operations to collect and report evaluation information relating to its corresponding deployment location. The controller may receive at least one evaluation report comprising an evaluation of computational or communication resource availability at the deployment locations.

26 Claims, 10 Drawing Sheets

(56) References Cited

U.S. PATENT DOCUMENTS

2016/0328258 A1   11/2016  Iwashina et al.
2016/0352578 A1   12/2016  Chen et al.
2016/0359704 A1*  12/2016  Gandham ........... H04L 63/1425
2016/0359889 A1*  12/2016  Yadav ................. H04L 63/1425
2017/0176033 A1*   6/2017  Tan ...................... G05B 19/048

OTHER PUBLICATIONS

Cloud Networking: Layer 2 Access in Amazon EC2, Oracle. (Year: 2014).*

* cited by examiner

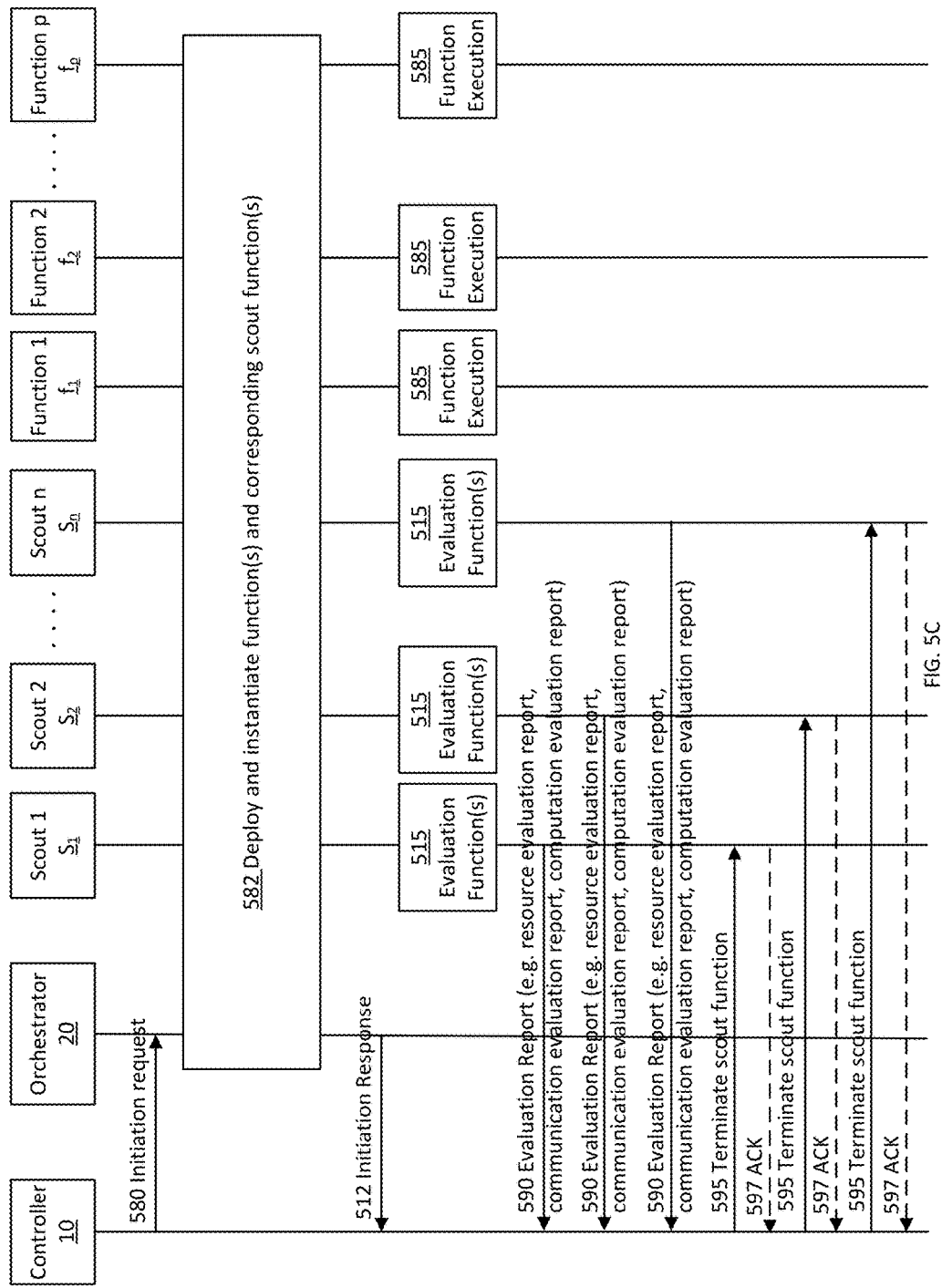

SCOUT FUNCTIONS

FIELD

The present application pertains to the field of networking and in particular to fault detection in networks.

BACKGROUND

In proposed next generation networks, such as the so-called fifth generation (5G) networks, some network functions are expected to be virtualized and implemented as network functions executing at computing resource locations available at multiple physical locations across the network. In networks implementing function virtualization, network functionality can be adaptable and flexible as network functions that are defined and implemented through software-based network functions may be deployed, or re-deployed, as necessary to provide changing functionality depending upon current requirements.

The combination of the network, and the computing resources available across the network, may be referred to as a network cloud environment. Network Function Virtualization (NFV) and cloud computing require the ability to create distributed network functions that operate, and interoperate, at multiple physical and logical locations across the network cloud environment.

While functions can be logically distributed across a network cloud environment, in practice they are being executed by individual computing elements that are subject to practical limitations. A function that operates without fault at one location may not operate as expected at another location due to limitations experienced at the other location. Current debugging tools and methods, necessitate a laborious trial and error process to attempt to identify the reason that a function is not performing as expected at a new location after it worked properly at a first location. Prior methods for debugging are generally limited to manual trial and error testing, ping testing, and network orchestrators that query network status indicators. The difficulty with these approaches is that the prior debugging tools tend to provide indirect indicators related to general network presence and availability.

These prior art methods generally involve deploying and activating a function into an active network cloud environment and observing how it operates, as well as its effect on the network once the function has been deployed and activated. For instance, a typical debugging operation will involve deploying a single process and observing live functionality, or deploying two processes and monitoring a communication path between the two processes.

A problem faced with deploying and activating network functions, and especially distributed network functions, in a network cloud environment is that successfully debugging a problem is difficult when a function does not perform as expected. In some cases, the problem may be a fault in the function itself. In other cases, the problem may be a deployment-related fault. Differentiating between function-inherent faults and deployment-related faults is a time-consuming process.

There are many reasons that a network function may not operate as expected after deployment, including: insufficient memory at the deployment location, limited CPU resources at the deployment location, incorrect hardware versions, incorrect virtual network, incorrect physical networking, incorrect Operating System (OS) kernel settings, etc.

Distributed network functions exacerbate the complexity of the problem as a set of distributed network functions must work together and interoperate, while each of the distributed network functions is located within a separate virtual and/or physical environment from the other functions. While ideally all computing elements within a network would be identical, in practice computing elements are deployed in different locations and at different times. This leads to practical limitations in that hardware versions, operating system versions, software versions may vary from location to location, and different locations may experience different levels of network and/or computational load. As a result, function interaction with different computing environments at each deployment location can be the cause of network cloud environment impairments. It would be useful to have a system and method for identifying deployment-related faults either in advance, or after deployment of the distributed network functions.

Another problem faced with deploying and activating network functions, is that it may be difficult to determine in advance whether the function will actually operate as expected. Given that deployment of a function within a live network possible negative results including poor function performance may impair other network operations leading to complications and downtime. While a deployed network function may appear to work normally, its deployment may impair other aspects of the network cloud environment. As the deployed network function does not appear impaired to an administrator, it may be a difficult task to trace down its deployment as the cause of impairments in the network cloud environment. It would be useful to have a system and method for identifying deployment-related faults that operates in parallel with deployment of a network function, to assist in identifying network cloud environment impairments that may arise due to its deployment.

Therefore, there is a need for systems and methods that are not subject to one or more limitations of the prior art.

This background information is provided to reveal information believed by the applicant to be of possible relevance to the present application. No admission is necessarily intended, nor should be construed, that any of the preceding information constitutes prior art against the present application.

SUMMARY

In a first aspect of the present invention, there is provided a fault detection method executable by a controller is provided for detecting faults in a network cloud environment. The method comprises transmitting a request to activate at least two scout functions at deployment locations in the network cloud environment, each scout function operable to execute one or more evaluation operations to collect and report evaluation information relating to its corresponding deployment location; and receiving at least one evaluation report comprising an evaluation of computational or communication resource availability at the deployment locations.

In an embodiment of the first aspect, before the controller activates the at least two scout functions, the method further comprises the controller transmitting a request to instantiate and configure the at least two scout functions at the deployment locations. In another embodiment, the at least one evaluation report further comprises an evaluation of communication resources between two or more scout functions. In a further embodiment, the at least one evaluation report is received by the controller either accessing a read port of the scout function or receiving a report transmitted by the scout function. In another embodiment, the method further comprises transmitting an initiation request to instantiate and configure a network function at one of the deployment locations. In another embodiment, the method further comprises deploying a network function in parallel with one of the at least two scout functions. In some embodiments, the scout function comprises a scout function wrapper and the network function is deployed within a virtual environment provided by the scout function wrapper. In another embodiment, the evaluation report further comprises an evaluation of communications transmitted by, or received from, a network function. In a further embodiment, after receipt of the at least one evaluation report the method further comprises transmitting to the scout function an instruction to execute a further evaluation function. In some embodiments, the further evaluation function is more demanding of the network cloud environment than one or more evaluation operations. In another embodiment, all of the at least two scout functions comprises a same reproducible generic evaluation function. In a further embodiment, at least one scout function includes at least one adjustable parameter operative to vary a corresponding functionality of that scout function. In some embodiments, the at least one adjustable parameter is operative to vary one or more of: a resource measurement value; a communication delay threshold; a communication error rate; a set of one or more peer scout addresses; a computation measurement value; a report mode; and, a scout function duration value. In another embodiment, at least one of the at least two scout functions comprises a customized scout function.

In a second aspect of the present invention there is provided a computer program product comprising a non-transitory computer readable memory storing computer executable instructions thereon that when executed by a computing system perform the method steps of the first aspect of the present invention along with any of the related embodiments.

In a third aspect of the present invention, there is provided a controller operative to detect faults in a network cloud environment. The controller comprises a network interface, a c processor and a non-transitory memory. The non-transitory memory stores instructions that when executed by the processor cause the controller to be configured to transmit a request to activate at least two scout functions at deployment locations in the network cloud environment, each scout function operable to execute one or more evaluation operations to collect and report evaluation information relating to its corresponding deployment location; and, receive at least one evaluation report comprising an evaluation of computational or communication resource availability at the deployment locations.

In an embodiment of the third aspect of the present invention, the controller is configured so that before it activates the at least two scout functions, it transmits a request to instantiate and configure the at least two scout functions at the deployment locations. In another embodiment, the at least one evaluation report comprises an evaluation of communication resources between two or more scout functions. In an embodiment, the controller is further configured to receive the at least one evaluation report either by accessing a read port of the scout function or by receiving a report transmitted by the scout function. In another embodiment, the controller is further operative to transmit an initiation request to instantiate and configure a network function at one of the deployment locations. In a further embodiment, the controller is further operative to deploy a network function in parallel with one of the at least two scout functions. In another embodiment, the scout function comprises a scout function wrapper and the network function is deployed within a virtual environment provided by the scout function wrapper. In another embodiment, after receipt of the at least one evaluation report the controller is further operative to transmit to the scout function an instruction to execute a further evaluation function. In another embodiment, at least one of the at least two scout functions includes at least one adjustable parameter operative to vary a corresponding functionality of that scout function. The at least one adjustable parameter can be operative to vary one or more of: a resource measurement value; a communication delay threshold; a communication error rate; a set of one or more peer scout addresses; a computation measurement value; a report mode; and, a scout function duration value.

Those skilled in the art will appreciate that the embodiments described above may be implemented atop the aspect of the present invention that they are related to, in conjunction with another embodiment, or atop an aspect of the present invention that it was not necessarily described in conjunction with.

BRIEF DESCRIPTION OF THE FIGURES

Further features and advantages will become apparent from the following detailed description, taken in combination with the appended drawings, in which:

FIGS. 5A, 5B, & 5C are signaling diagrams illustrating embodiments of scout function, controller, and orchestrator interaction.

It will be noted that throughout the appended drawings, like features are identified by like reference numerals.

DETAILED DESCRIPTION

As will be described below, embodiments of the present invention provide a mechanism for a network controller, such as an orchestrator, to preemptively determine whether a network function can be moved from one location to another without experiencing network issues. A virtual network function (VNF) is instantiated upon a set of network resources. An instantiated VNF can either be configured or not. A configured VNF can be either active or inactive. An instantiated and configured function may consume storage resources but typically does not consume a large quantity of processor resources until it is activated. To ensure that an instantiated and active network function can be moved to a second location, a virtual "scout: function can be instantiated in a manner that consumes compute, storage (and in some embodiments connectivity) resources similar to the actual VNF. By allowing the scout function to consume resources at the destination location, network performance can be monitored to determine if the instantiation of the scout function causes problems. If no problems are detected, the scout function can be replaced with the VNF to be moved. In some embodiments, a VNF resides within a scout function "wrapper", so that the resources consumed by a scout function do not have to be released before instantiating the VNF being moved.

Figure 1:
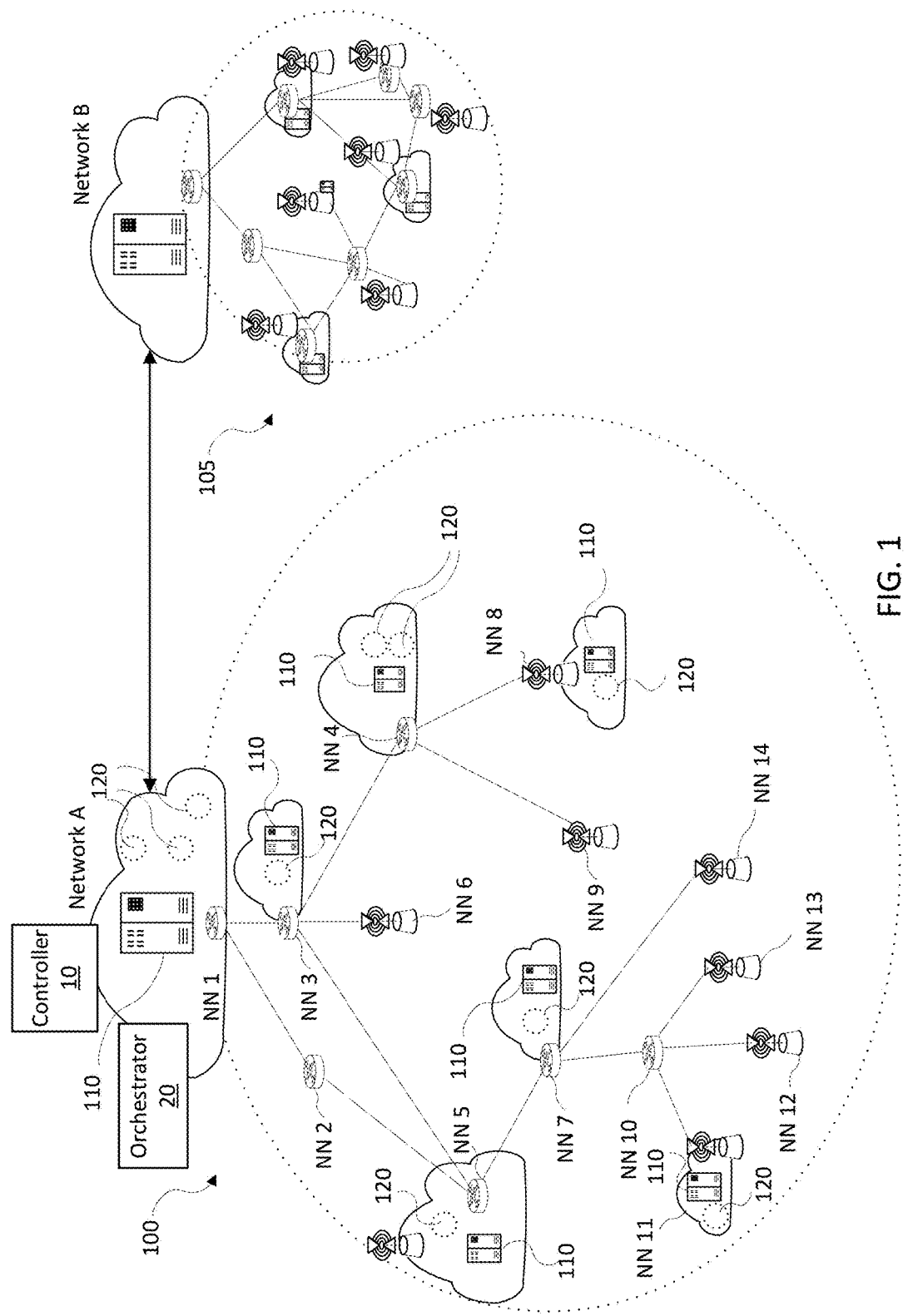
FIG. 1 is a simplified network diagram illustrating an embodiment of a system for fault detection.

FIG. 1 is a simplified network diagram illustrating an embodiment of a system for fault detection. In this example, a network A 100 is made up of a plurality of network nodes (NN1 to N 14. The network A 100 may be a sub-network within a larger network or, as illustrated in the example of FIG. 1, may be in operative communication with another network B 105. In this example, network A 100 is generally hierarchical, but this is just for illustrative purposes and is not intended be limiting on the form of possible network configurations.

Network A 100 includes a plurality of computing resources 110 located at different network nodes (i.e. NN 1, NN 3, NN 4, NN 5, NN 7, NN 8, NN 13). In next generation networks, some or all of the network assets are configured in software. Accordingly, most network assets may include computing resources 110 that may be adapted or modified through instantiating one or more network functions. These include at radio access nodes ((R)ANs), routers, data centres, and other network nodes of the network A 100. While only 7 network nodes are indicated as including computing resources 100 in FIG. 1 as these locations are used in this example, it should be understood that some or all of the other network nodes may also include computing resources 100.

The instantiation of network functions is effected by an orchestrator 20. In some implementations, a plurality of orchestrators 20 distributed through some or all of the network nodes may be used. For simplicity, the present application refers to a single orchestrator 20, but it is understood that some or all of the network nodes may have their own orchestrator(s) 20 depending upon the network architecture. The use of orchestrators 20 for deploying network functions is known and discussed for next generation networks, such as those proposed by the 3GPP telecommunications standard development organization.

As illustrated, in the example of FIG. 1, intended network function deployment locations 120 are indicated in some of the network nodes (i.e. NN 1, NN 3, NN 4, NN 5, NN 7, NN 8, NN 13). In the example of FIG. 1, it is intended to illustrate that a proposed network function deployment includes some distributed network nodes (i.e. NN 1, NN 3, NN 4, NN 5, NN 7, NN 8, NN 13), and the specific deployment locations 120 are for illustrative purposes only and not intended to be limiting. The deployment locations 120 may be physically separate, may be deployed within separate virtualizations within a single server or server cluster, or may be deployed within a single virtualization. In most practical examples for next generation networks, the deployment locations 120 are distributed across the network A 100 at different network nodes to enable network cloud environment functionality.

In this embodiment, a controller 10 may be used to initiate a fault detection method in coordination with the orchestrator 20. Similar to the orchestrator 20, while only one controller 10 is illustrated it is understood that more than one controller 10 may be employed. In some embodiments, the controller 10 may, for instance, be a distributed function with local controllers 10 proximate to some or all of the deployment locations 120. In some implementations, the controller 10 and the orchestrator 20 may comprise a single functional entity, with the controller 10 providing additional functionality to the conventional orchestrator 20. In some implementations, the controller 10 and the orchestrator 20 may comprise separate functional entities with the controller 10 directing the orchestrator 20 to carry out necessary function deployment and instantiation steps. The present application describes the controller 10 and the orchestrator 20 as separate entities to simplify the explanation for the reader, but this is not intended to be limiting.

As will be described in more detail below, the controller 10 is operative to direct the orchestrator 20 to instantiate and configure at least one scout function at a deployment location 120. Depending upon the fault detection method selected, scout functions may initially be deployed one at a time to each deployment location 120, or may be selected as a set of a plurality of scout functions, at least one scout function at each deployment location 120. The present application assumes that at plurality of scout functions are being deployed for explanatory purposes.

Each of the at least one scout functions may be instantiated and configured along with deployment of a corresponding network function at that deployment location 120. In some implementations, the scout functions may further be activated at the deployment time. In some implementations, the scout functions may just be instantiated and configured and remain inactive until activated at a later time after the deployment time. In this fashion, the scout functions may conveniently be deployed with the network functions to each deployment location 120 at the deployment time, but may remain inactive unless/until their evaluation services are required.

After activation, each of the scout functions may evaluate a local environment at a corresponding deployment location 120 associated with that scout function, collect evaluation information, and report some or all of the evaluation information relating to the local environment at that deployment location 120 back to the controller 10. In some implementations, the scout functions may be operative to collect and retain the evaluation information, and to make it available, for instance at a read port, for collection by the controller 10.

The present application groups types of evaluation information for explanatory purposes, but separating evaluation information by type is not a requirement. In some implementations, a scout function may be operative to execute their evaluation functions in a step-wise approach, starting with more passive collection operations, and only succeeding to more resource intensive evaluation operations after each evaluation operation returns a positive result. In these implementations, the scout function follows a sequence of steps defined by the controller 10 that serves to minimize the risk of the scout function interfering with live processes in the network cloud environment. In some implementations, a scout function may execute the evaluation functions a single time, and then automatically terminate. In some implementations, a scout function may persist for a pre-determined number of execution cycles, time, or other duration value. In some implementations, a scout function may persist indefinitely, until terminated by the controller 10 and/or the orchestrator 20. In some implementations, a scout function may be a generic fault detection function that may be quickly duplicated with a same set of evaluation functions. In some implementations, a scout function may be a generic fault detection function that includes at least one adjustable evaluation parameter. Either a user, or an automated process, may adjust the at least one adjustable evaluation parameter as necessary and duplicate plurality of scout functions either with the same at least one adjustable evaluation parameter setting, or with different settings.

Figure 2A:
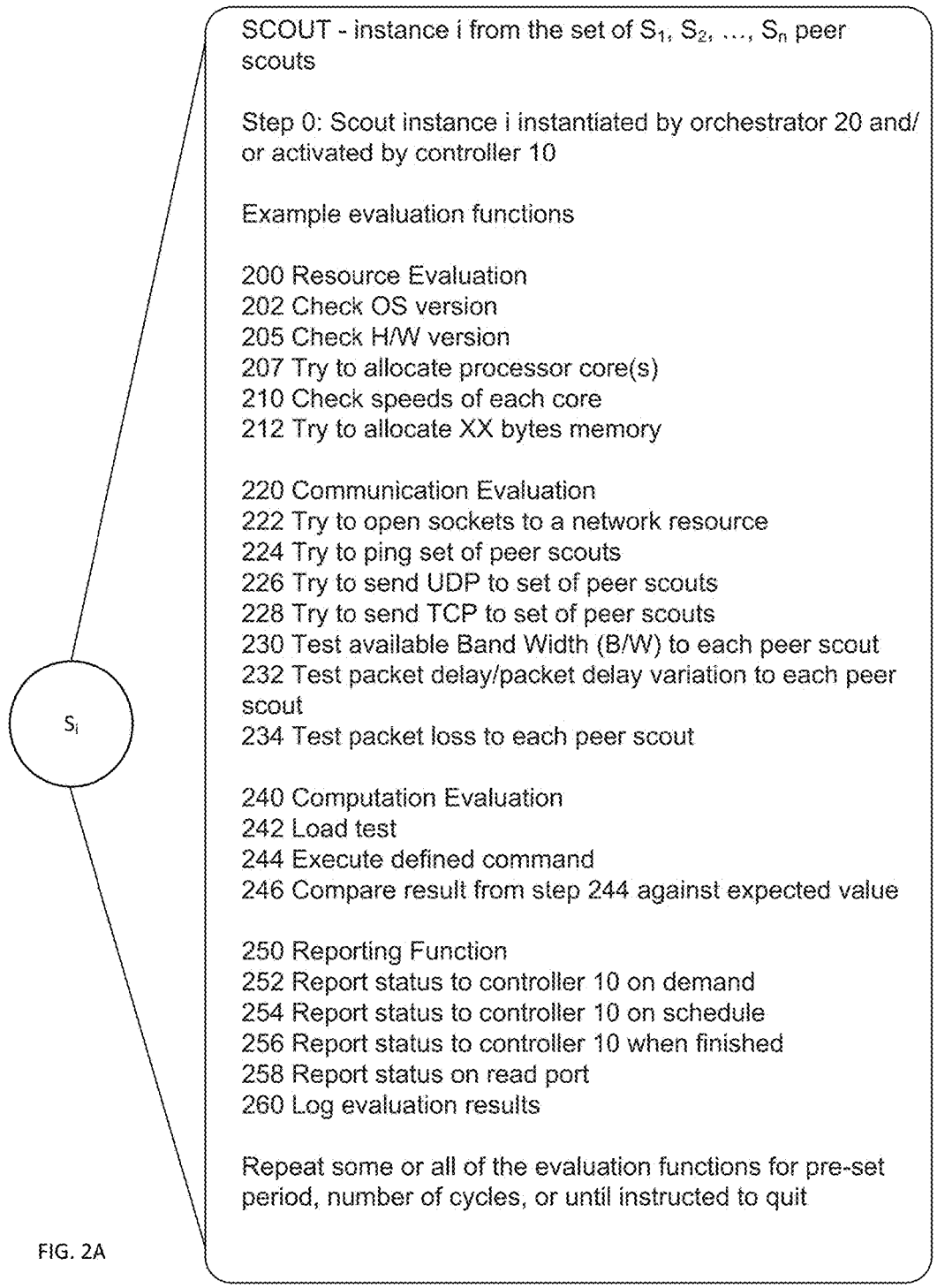
FIG. 2A is a block diagram illustrating an embodiment of a scout function.

FIG. 2A is a block diagram illustrating an embodiment of a scout function. In the example of FIG. 2A, a scout function instance $S_i$, is indicated as having a number of available evaluation functions. The listed evaluation functions are included for explanatory purposes only. A scout function $S_i$ may include some or all of these evaluation functions, and may include other evaluation functions as necessary to obtain requisite information for fault detection in a particular network. The evaluation functions may, for instance, be included in every scout function instance $S_i$, or may be selected and included by the controller 10 such that a particular scout function instance $S_i$ includes a subset of all available evaluation functions.

Generally, for testing a network cloud environment, a plurality of scout functions ($S_1, S_2, \ldots S_n$) will be deployed in order to conduct fault detection across the network cloud environment. As indicated above, each scout function instance $S_i$ of the set may be a duplicate, or may be parameterized to have different functionality form other scout function instances $S_i$ from the set. Each scout function instance $S_i$ is instantiated and configured by the orchestrator 20 in coordination with the controller 10. In implementations where scout functions have previously been instantiated and configured by the orchestrator 20, the scout function instances $S_i$ may only require activation by the controller 10.

For explanatory purposes only, the range of evaluation operations have been divided into four (4) functionalities. It is understood that, depending upon requirements, different evaluation functions may be employed though they may not be aptly described under one of these categories. The four functionalities identified in FIG. 2A include resource evaluation functions 200, communication evaluation functions 220, computation evaluation functions 230, and reporting functions 240. In some implementations, a scout function instance $S_i$ may be parameterized to successively step through the different evaluation functionalities after successful evaluation of each functionality. In this way, a scout function instance $S_i$ may be deployed and activated to have a slowly increasing burden on computing and communication resources at the deployment location 120. As a result, unlike the network function intended to be deployed at the deployment location 120, the scout function instance $S_i$ may be less likely to disrupt ongoing processes in the network cloud environment.

The resource evaluation functions 200 include any tests or queries that assess the available computing resources at the deployment location 120. For instance, the resource evaluation functions 200 may include: checking an operating system version 202, checking a hardware version 205, requesting an allocation of one or more processor cores 207, checking a version or speed of each allocated core 210, requesting memory allocation 212, etc. In some implementations, the number of processing cores, size of memory allocation, and other resource evaluation tests may rely on a parameter setting defined by the controller 10. In some implementations, after completing the resource evaluation functions 200, the scout function instance $S_i$ may report back to the controller 10 through one or more reporting functions 250. In some implementations, the scout function instance $S_i$ may confirm that each test is above a pre-defined threshold, or meets an expected result, and then automatically progress to further evaluation functions. In some implementations, the scout function instance $S_i$ may report back to the controller 10 and wait for instructions to proceed to further evaluation functions.

The communication evaluation functions 220 include all tests that confirm connectivity with other resources and scout function instances $S_i$. Similar to the resource evaluation functions 200, the communication evaluation functions 220 may be organized in a progressive step-based series such that the scout function instance $S_i$ progresses through successively higher demands on the network environment. Some of the communication evaluation functions 220 that may be performed include: attempting to open one or more sockets to one or more network resources 222, attempting to ping the set of peer network scout function instances $S_{1 \ldots n}$ 224, attempting to send UDP to the set of c, attempting to send TCP to the set of peer network scout function instances $S_{1 \ldots n}$ 228, test available communication bandwidth to each peer scout function instance $S_i$ from the set of scout function instances $S_{1 \ldots n}$ 230, test packet delay/packet delay variation to each peer scout function instance $S_i$ from the set of scout function instances $S_{1 \ldots n}$ 232, test packet loss between each peer scout function instance $S_i$ from the set of scout function instances $S_{1 \ldots n}$ 234, etc. The communication evaluation functions 220 may include similar tests to other network resources, including to network interfaces and network control functions that are relevant to the network functions to be deployed at the deployment locations 120.

The computation evaluation functions 240 include all tests that confirm computation availability and accuracy. Some of these tests may overlap with what could also be considered to fall under resource evaluation functions 200 or communication evaluation functions 220, though for the purposes of this application they have been separated for explanatory purposes. In general, computation evaluation functions 240 include functions that tax or load the computation resources of the network cloud environment, and are more likely to impair live processes. Similar to the resource evaluation functions 200 and the communication evaluation functions 220, the computation evaluation functions 240 may be organized in a progressive step-based series such that the scout function instance $S_i$ progresses through successively higher demands on the network environment. Some of the computation evaluation functions 220 that may be performed include a load test 242, defined command execution 244, comparison of results obtained from command execution 244 with an expected value 246, simulated data processing and data exchange with peer scout function instances $S_i$ from the set of scout function instances $S_{1 \ldots n}$.

The reporting functions 250 include all operations to collect and report results from the above three evaluation functionalities. In general, the controller 10 may set each scout function instance $S_i$ to follow a specified reporting protocol. For instance, the reporting protocol may include any of: reporting status to the controller 10 on demand 252, reporting status to the controller 10 on schedule 254, reporting status to the controller 10 upon completion 256, either by evaluation function, group of evaluation functions, or all functions, reporting status to the controller 10 by making results available on a read port 258 that is accessible to the controller 10, FIGS. 2B, 2C, & 2D are simplified block diagrams illustrating embodiments of scout function operation where scout function instances $S_{1 \ldots n}$ are deployed alone to deployment locations $120_{1 \ldots n}$.

Figure 2B:
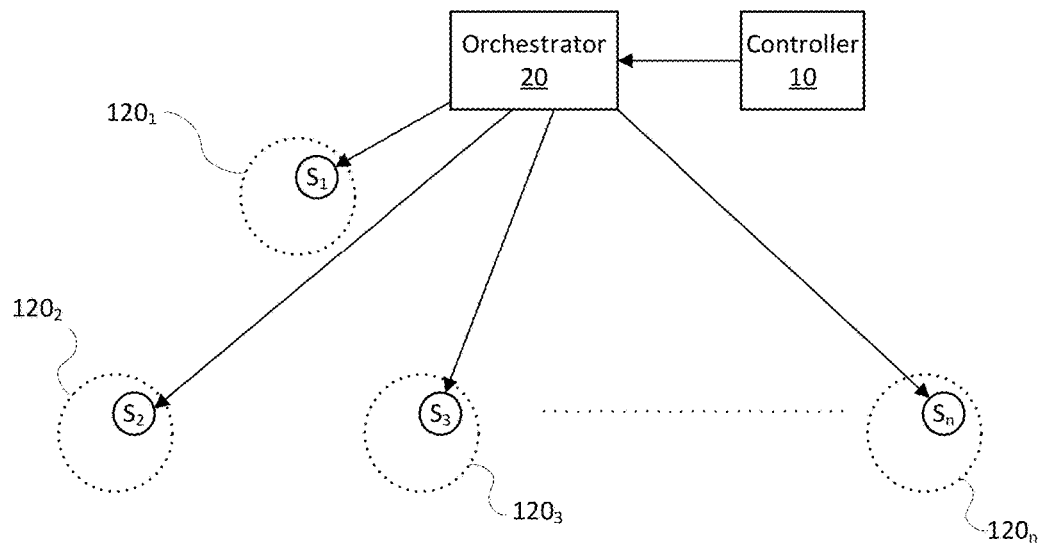
FIGS. 2B, 2C, & 2D are simplified block diagrams illustrating embodiments of scout function operation.
Figure 2C:
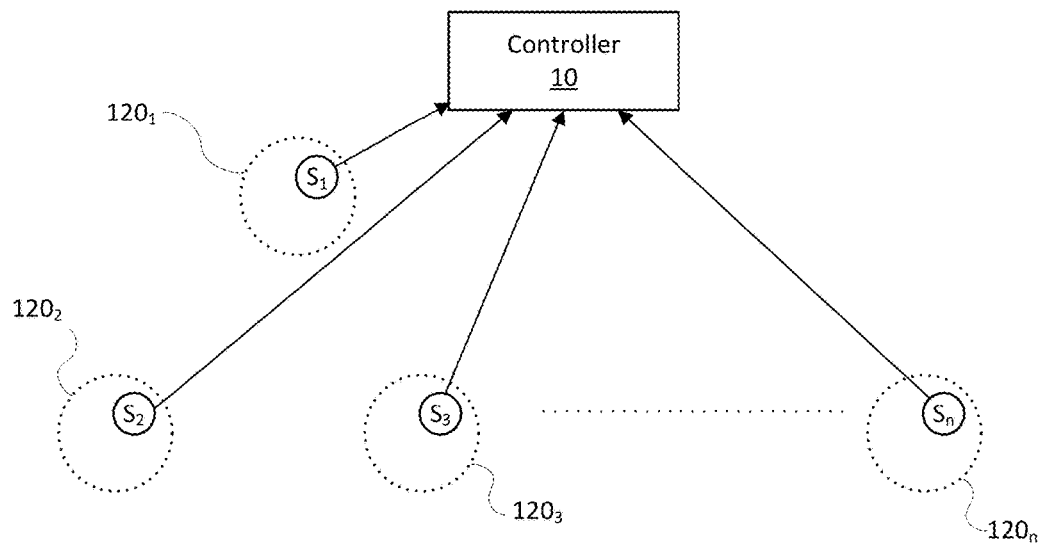
Figure 2D:
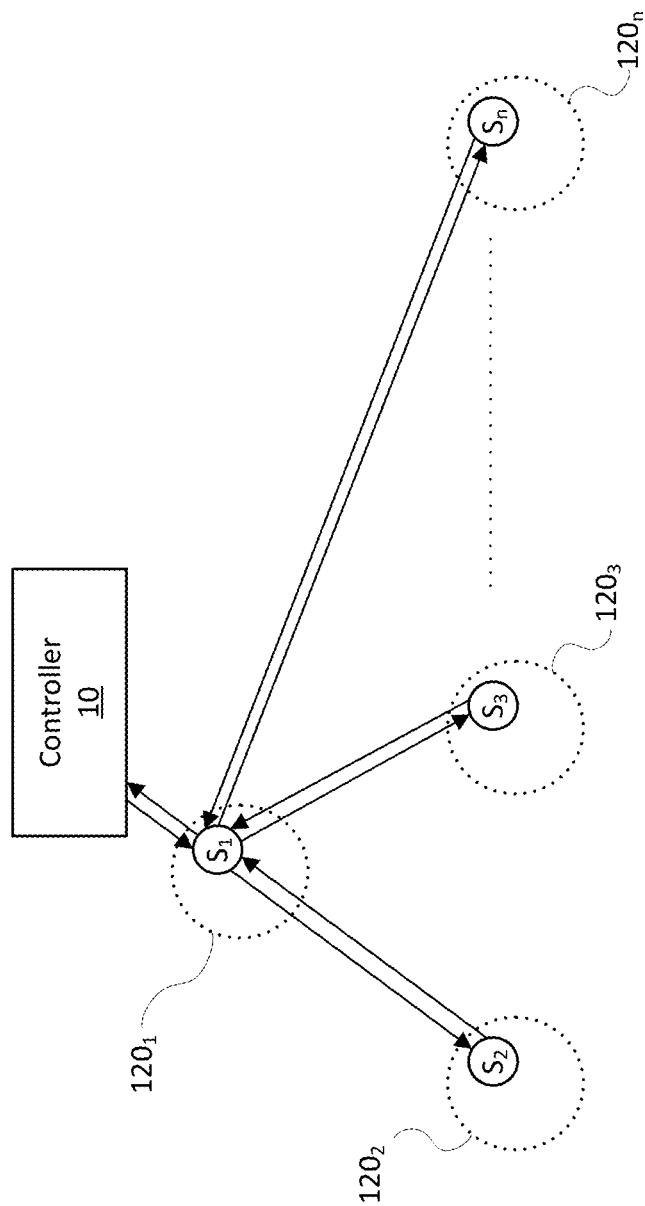

Referring to FIG. 2B, a simplified block diagram is presented illustrating a first step wherein the controller 10 has directed the orchestrator 20 to instantiate and configure scout function instances $S_{1 \ldots n}$ in corresponding deployment locations $120_{1 \ldots n}$. Referring to FIG. 2C, once activated the instantiated scout function instances $S_{1 \ldots n}$ transmit, or make available, a report to the controller 10. For example, the activated scout function instances $S_{1 \ldots n}$ may have completed one or more resource evaluation functions, and are reporting the result(s) to the controller 10. Referring to FIG. 2D, the first instantiated, configured, and activated scout function instance $S_1$ is illustrated conducting a peer scout instance $S_{1...n}$ communication test and transmitting the results, or making available, to the controller 10.

Figure 3A:
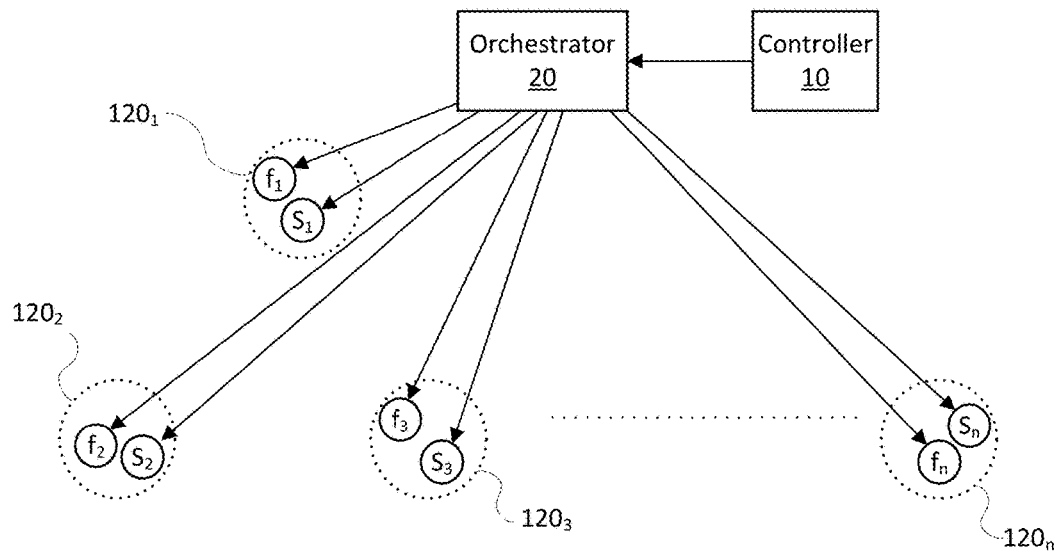
FIGS. 3A & 3B are simplified block diagrams illustrating embodiments of scout function operation.
Figure 3B:
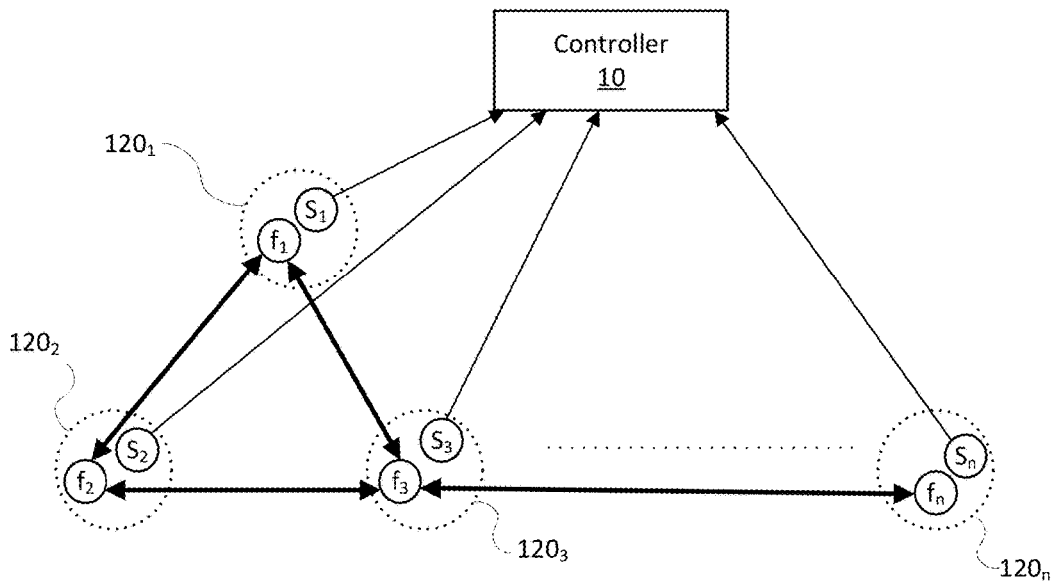

FIGS. 3A & 3B are simplified block diagrams illustrating embodiments of scout function operation where scout function instances $S_{1...n}$ are deployed to deployment locations $120_{1...n}$ in parallel to network functions.

Referring to FIG. 3A, a simplified block diagram is presented illustrating a first step wherein the controller 10 has directed the orchestrator 20 to instantiate and configure scout function instances $S_{1...n}$ and network functions $f_{1...n}$ in corresponding deployment locations $120_{1...n}$. Referring to FIG. 3B, the network functions $f_{1...n}$ are exchanging communications and carrying out network function related processing. The scout function instances $S_{1...n}$ evaluate their local resource conditions and transmit, or make available, reports to the controller 10. In this example, the scout function instances $S_{1...n}$ are collecting evaluation information and reporting the collected evaluation information to the controller 10. In some implementations, the scout function instances $S_{1...n}$ may further exchange communications to evaluate communication conditions in the live network environment.

Figure 4A:
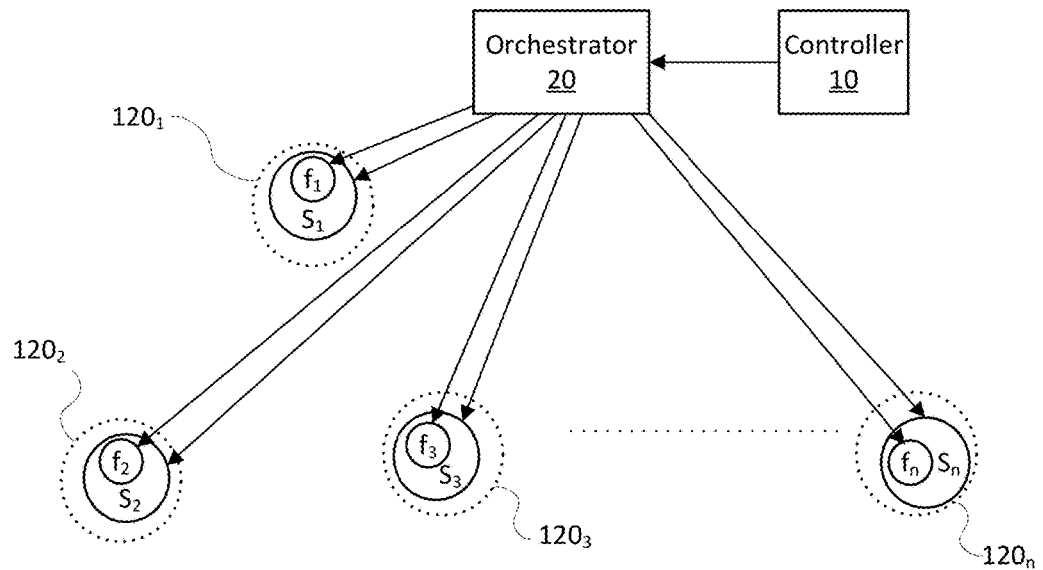
FIGS. 4A & 4B are simplified block diagrams illustrating embodiments of scout function operation.
Figure 4B:
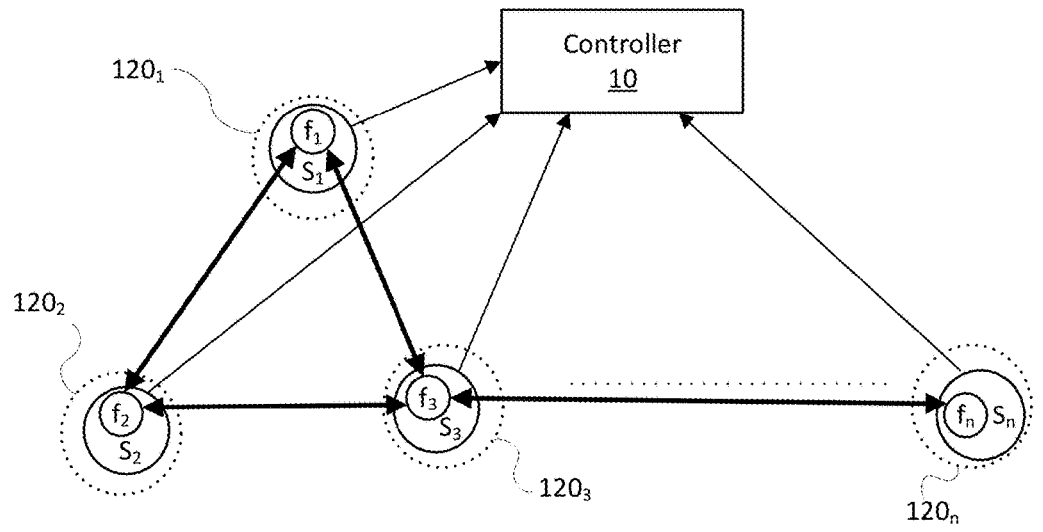

FIGS. 4A & 4B are simplified block diagrams illustrating embodiments of scout function operation where scout function instances $S_{1...n}$ are deployed as scout function wrappers $S_{1...n}$ around network functions at deployment locations $120_{1...n}$. The scout function wrappers $S_{1...n}$ may each provide a virtual environment within which a corresponding network function can operate. The scout function wrappers $S_{1...n}$ supplement the services offered by the corresponding network functions, by adding the evaluation functions normally offered by the scout function. In addition to the evaluation services provided by the scout function, the scout function wrappers may further monitor the communications exchanged, and computational demands made, by the network functions.

Referring to FIG. 4A, a simplified block diagram is presented illustrating a first step wherein the controller 10 has directed the orchestrator 20 to instantiate and configure scout function wrappers $S_{1...n}$ around network functions $f_{1...n}$ in corresponding deployment locations $120_{1...n}$. The deployment of scout function wrappers $S_{1...n}$ allows for additional monitoring of communications and resource demands made by each of the network functions $f_{1...n}$. Referring to FIG. 4B, the network functions $f_{1...n}$ are exchanging communications and carrying out network function related processing. The exchanged communications and/or communication/computation demands pass through the scout function wrappers $S_{1...n}$. The scout function wrappers $S_{1...n}$ may evaluate both their local resource conditions, as well as monitor specific calls and communication exchanges made by the network functions $f_{1...n}$. The scout function wrappers $S_{1...n}$ may then transmit, or make available, reports to the controller 10 including network function specific evaluations. In this example, the scout function wrappers $S_{1...n}$ are collecting evaluation information and reporting the collected evaluation information to the controller 10. In some implementations, the scout function wrappers $S_{1...n}$ may further exchange communications to evaluate communication conditions in the live network environment.

Figure 5A:
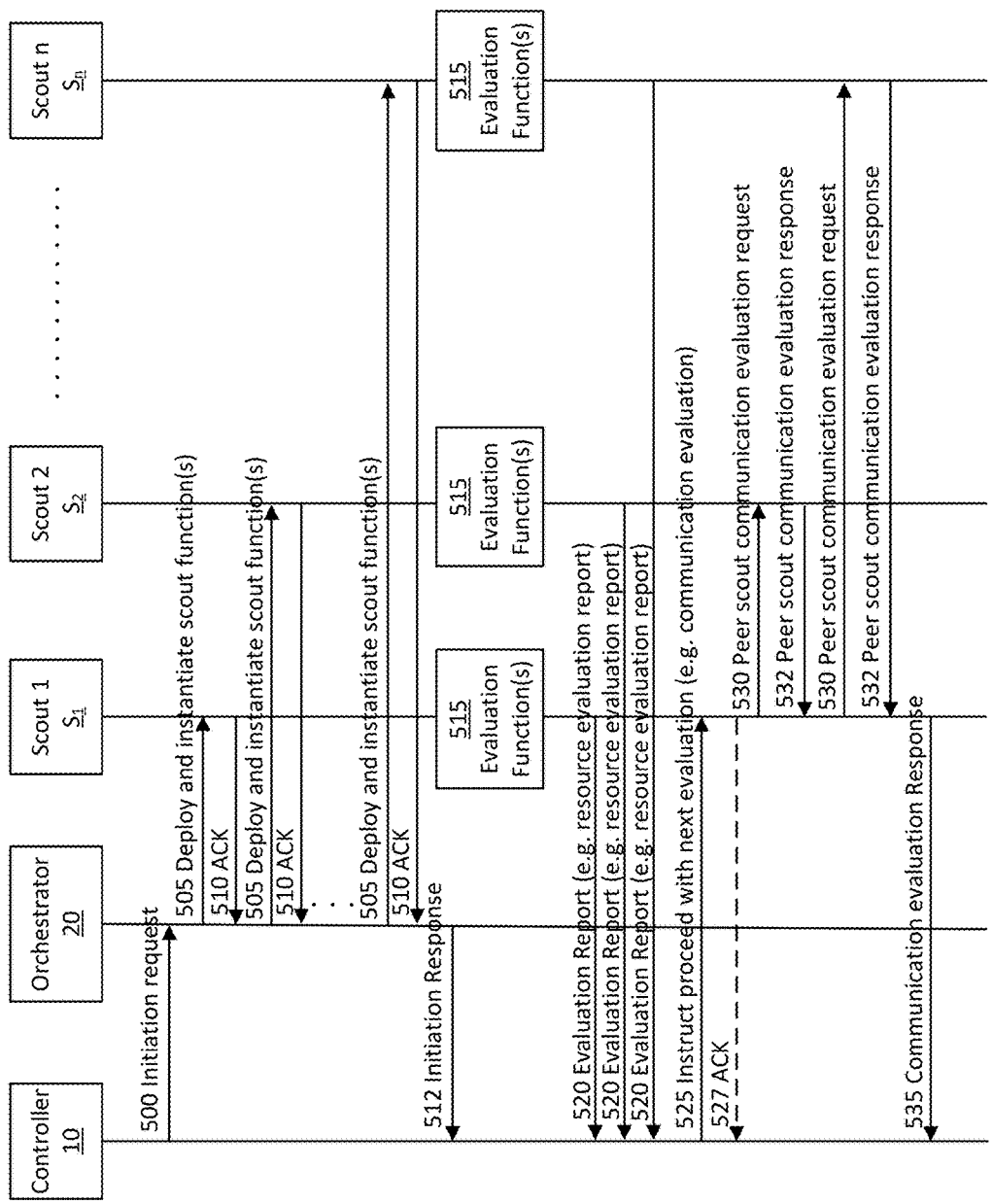
Figure 5B:
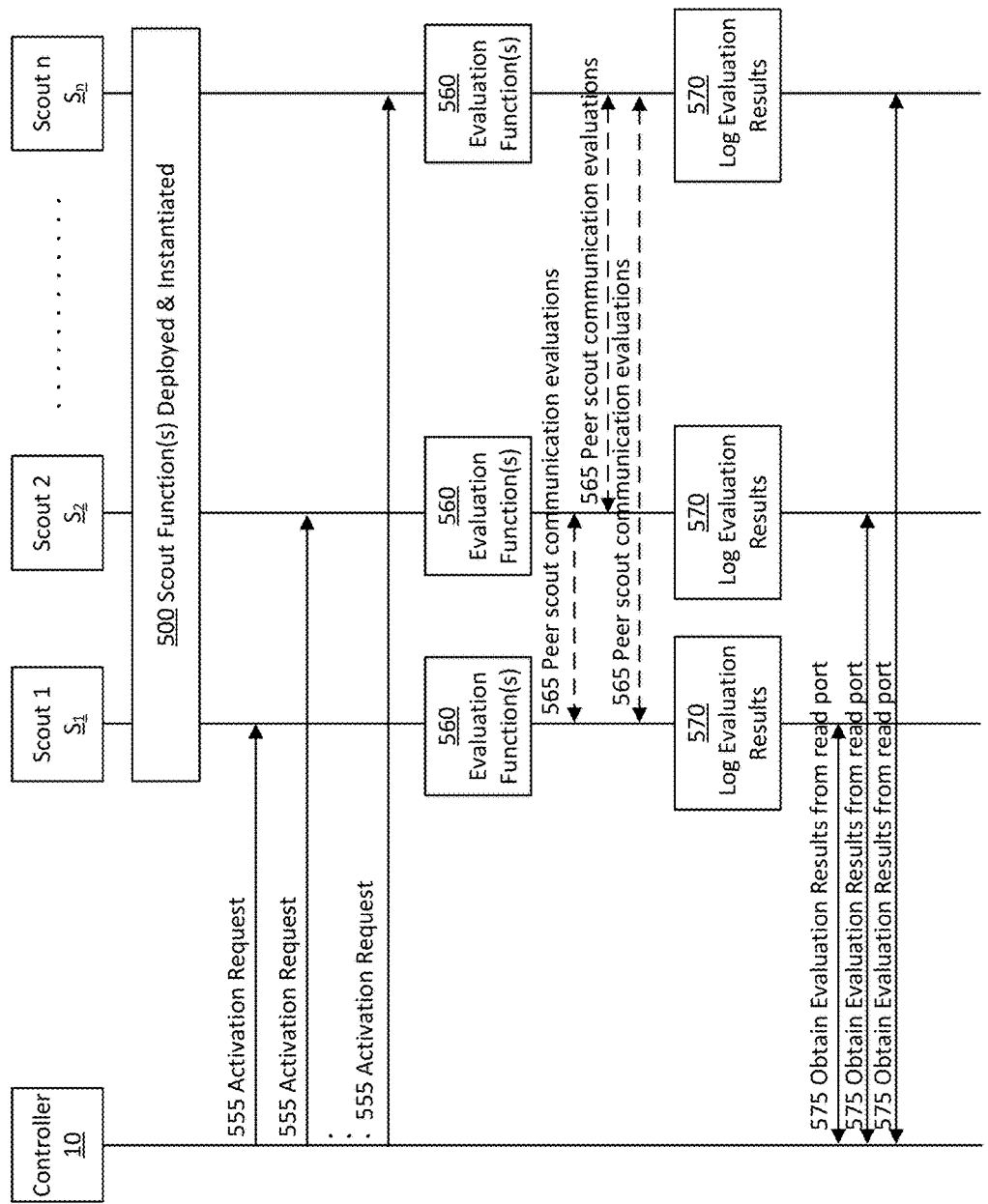

FIGS. 5A, 5B, & 5C are signaling diagrams illustrating embodiments of scout function, controller, and orchestrator interaction.

Referring to FIG. 5A, in step 500 the controller 10 transmits an initiation request to the orchestrator 20. Upon receipt of the initiation request, in step 505 the controller deploys and instantiates the specified scout functions. Each scout function instance $S_i$ may, in step 510, transmit an acknowledge to the orchestrator 20 upon successful deployment and instantiation. Upon successful deployment and instantiation, in step 512 the orchestrator 20 transmits an initiation response to the controller 10. The initiation response may include for instance, addresses of the deployed scout functions $S_{1...n}$.

Depending upon the implementation, the scout functions $S_{i...n}$ may either communicate directly with controller 10 after deployment, or may communicate through an intermediary such as the orchestrator 20. In the embodiment of FIG. 5A, the scout functions $S_{i...n}$ are illustrated as directly communicating with the controller 10. Furthermore, after instantiation, the scout functions $S_{i...n}$ may either begin their evaluation functions without further input, or may wait for an instruction to begin their evaluation functions from the controller 10. In the embodiment of FIG. 5A, in step 515 the scout functions $S_{i...n}$ are illustrated as beginning the their evaluation functions without further input. As indicated above, the evaluation functions may include a number of tests and queries to obtain information about the network cloud environment local to each scout function instance $S_i$. In the example of FIG. 5A, it is indicated that the evaluation functions included in step 515 are resource evaluations. In step 520 each of the scout functions $S_{i...n}$ transmits an evaluation report, in this case a resource evaluation report, to the controller 10.

Depending upon the implementation, the scout functions $S_{i...n}$ may either be operational to continue their evaluation functions without further instruction provided the initial evaluations meet a pre-determined threshold, or may wait for further instruction from the controller 10. In the example of FIG. 5A, in step 525 the controller 10 transmits an instruction to proceed with further evaluation functions, in this case the communication evaluation functions 220. In this example, the controller 10 is only transmitting the instruction to a single scout function $S_1$, but the instruction may also be transmitted to other scout functions $S_{i...n}$ as required. In step 527, upon receipt of the instruction to proceed with further evaluation functions, the scout function $S_1$ may transmit an acknowledgement to the controller 10. In some implementations, the acknowledgement may take the form of the communication evaluation response 535. In steps 530, the scout function $S_1$ transmits peer scout communication evaluation requests to one or more of the other peer scout functions from the set of scout functions $S_{i...n}$. in step 532, each of the peer scout functions transmits a peer scout communication evaluation response to the scout function $S_1$. The peer scout communication evaluation requests and peer scout communication evaluation responses may take the form of any communication evaluation function including without limitation a ping test, packet delay test, packet delay variation test, packet loss test, bandwidth test, etc. In step 535 the scout function $S_1$ transmits, or makes available, a communication evaluation response to the controller 10. The communication evaluation response may include one or more results of the communication evaluation(s), and/or a confirmation that the tests passed or met a pre-determined value. In some implementations, the communication evaluation procedure may be carried out with other network resources, such as network resources or network functions available on the network A 100.

FIG. 5B is a signaling diagram illustrating an embodiment where the scout functions $S_{i\ldots n}$ where previously instantiated and configured. In this embodiment, in step 555 the controller 10 transmits activation request(s) to the scout functions $S_{i\ldots n}$. In this example, upon receipt of the activation requests, in step 560 the evaluation functions start execution which includes step 565 peer scout communication evaluations. In step 570 the scout functions $S_{i\ldots n}$ log the evaluation results and make them available on read ports. In step 575 the controller 10 obtains the evaluation results by accessing each read port.

FIG. 5C is a signaling diagram illustrating an embodiment where the scout functions $S_{1\ldots n}$ are deployed with corresponding network functions $f_{1\ldots p}$ and the scout functions $S_{1\ldots n}$ are terminated on command. In step 580 the controller 10 transmits an initiation request to the orchestrator. In process 582 the orchestrator 20 deploys and instantiates the scout functions $S_{1\ldots n}$ and network functions $f_{1\ldots p}$. In step 512, the orchestrator 20 transmits an initiation response to the controller 10. The initiation response may include, for instance, addresses of the scout functions $S_{1\ldots n}$ and/or the network functions $f_{1\ldots p}$.

In step 585 the network functions $f_{1\ldots p}$ being function execution, while at the same time in parallel the scout functions $S_{1\ldots n}$ execute the evaluate functions. In step 590, the scout functions $S_{1\ldots n}$ transmit evaluation reports to the controller 10. In step 595, the controller 10 transmits to each scout function $S_{1\ldots n}$ an instruction to terminate. In optional step 597, upon receipt of the instruction to terminate, the scout functions $S_{1\ldots n}$ transmit acknowledgements to the controller 10 before releasing resources and terminating.

In some embodiments, after scout function deployment and activation, a method may be provided for testing a change in the network cloud environment. Network cloud operations provide for the dynamic change of the physical cloud hardware while the network cloud environment is actively providing services. For example, some of the many hardware-related changes that can be effected while maintaining active services include adding new servers, removing old servers, temporarily powering down servers for maintenance, adding new routers and/or switches with resulting differences in routing between the servers, adding or removing capacity between switches and servers, and changes to the LAG protocols between switches and between switches and servers.

In addition to hardware-related changes, network cloud operations provide for the dynamic change of the cloud software while the network cloud environment is actively providing services. The changes may include, for instance, software-related changes such as moving a Virtual Machine (VM) from one server to another, moving live executing software programs or network functions from one server to another, changing data routing, changing QoS or QoE on network slices that support a service on which a network function relies, etc. Any of these changes may affect the network cloud environment in different ways at different locations within the network.

In these embodiments, a set of scout functions $S_{i\ldots n}$ can be used to indicate what the impacts of such changes might be on a collection of real distributed network functions. The scout functions may be used to help identify different sequences or timings in the changes that have the least impairment on the network cloud environment. In embodiments where network functions are wrapped within corresponding scout functions, any cloud environment impairments, including impairments which result from changes (hardware-related or software-related) to the network cloud environment can be identified. Furthermore, the inter-scout communications may yield useful information to assist in pinpointing a source of an impairment.

In an embodiment, a set of scout functions $S_{i\ldots n}$ is deployed and activated in a network cloud environment. The set of scout functions $S_{i\ldots n}$ evaluating the network cloud environment. A change is applied to the network cloud environment. The set of scout functions $S_{i\ldots n}$ capturing any variations perceived in the network cloud environment and transmitting a report identifying the perceived variations. In the event of receiving a report that the network cloud environment has been impaired from the perspective of one or more of the scout functions $S_{i\ldots n}$, an administrator can carry out debugging measures, using the report received from the set of scout functions $S_{i\ldots n}$. In some implementations, the network cloud environment may be impaired, but perceived variations may indicate a higher likelihood of problems arising in the future. Such variations may include, for instance, reduced resource availability or higher latency in a connection, among other variations. The administrator may use this information to take preventative measures before live network functions are impaired.

Figure 6:
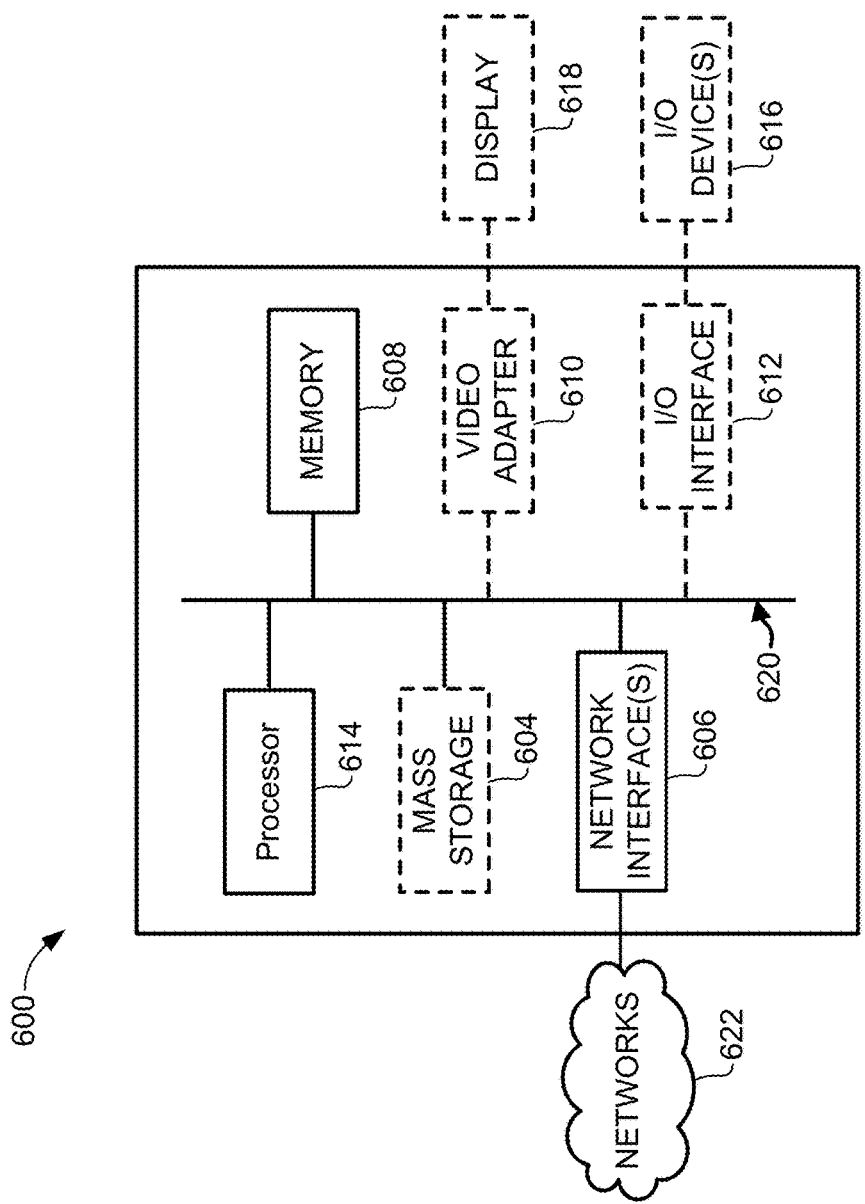
FIG. 6 is a simplified block diagram of an embodiment of a computing system.

FIG. 6 is a simplified block diagram of an embodiment of a computing system 600 that may be used for implementing the devices and methods disclosed herein. In particular, the network nodes may each include one or more computing systems 600. The network functions and scout functions described above may be instantiated by execution on one or more computing systems 600. In some implementations, network functions $f_j$ and/or scout functions $S_i$ may be instantiated across a plurality of computing systems 600 across a plurality of geographic locations.

Specific devices may utilize all of the components shown or only a subset of the components, and levels of integration may vary from device to device. Furthermore, a device may contain multiple instances of a component, such as multiple processors, memories, transmitters, receivers, etc. The computing system 600 includes a processor 614, a bus 620 and a memory 608, and may optionally also include a mass storage device 604, a video adapter 610, and an I/O interface 612 (shown in dashed lines). The computing system 600 may further include one or more network interface(s) 606 for connecting the computing system 600 to communication networks 622.

The processor 614 may comprise any type of electronic data processor, and may include one or more cores or processing elements. The memory 608 may comprise any type of non-transitory system memory such as static random access memory (SRAM), dynamic random access memory (DRAM), synchronous DRAM (SDRAM), read-only memory (ROM), or a combination thereof. In an embodiment, the memory 608 may include ROM for use at boot-up, and DRAM for program and data storage for use while executing programs. The bus 620 may be one or more of any type of several bus architectures including a memory bus or memory controller, a peripheral bus, or a video bus.

The mass storage 604 may comprise any type of non-transitory storage device configured to store data, programs, and other information and to make the data, programs, and other information accessible via the bus 620. The mass storage 604 may comprise, for example, one or more of a solid state drive, hard disk drive, a magnetic disk drive, or an optical disk drive.

The video adapter 610 and the I/O interface 612 provide optional interfaces to couple external input and output devices to the processing unit 602. Examples of input and output devices include a display 618 coupled to the video adapter 610 and an I/O device 616 such as a keyboard, touch-screen, mouse or other user input device coupled to the I/O interface 612. Other devices may be coupled to the computing system 600, and additional or fewer interfaces may be utilized. For example, a serial interface such as Universal Serial Bus (USB) (not shown) may be used to provide an interface for an external device. Alternatively, the computing system 600 may rely upon the network interface(s) 606 for connection to available mass storage(s), video adapter(s) 610, and I/O interface(s) 612 available on the networks 622.

In some embodiments, a computing system 600 may comprise a standalone server. In other embodiments, the computing system may comprise rack mounted server components networked together for connectivity. In some embodiments, the network functions $f_j$ and/or scout functions $S_i$ described above may be instantiated within a virtualized computing environment supported by one or more computing systems 600.

In some embodiments, a graphical user interface (GUI) may be provided for exchanging information with a user managing the controller 10. In these embodiments, at least some of the information reported to the controller 10 by the scout functions $S_{i\ldots n}$. In an embodiment, a GUI may be provided that includes graphical representation of one or more scout functions $S_{i\ldots n}$, an evaluation report result, and/or a selectable parameter of at least one of the one or more scout functions $S_{i\ldots n}$. In some implementations, the GUI may be operable to receive user input to adjust the selectable parameter, to transmit the selected parameter to the one or more scout functions $S_{i\ldots n}$, for execution, and to display evaluation report results received from the one or more scout functions $S_{i\ldots n}$.

Although the present application describes specific features and embodiments, it is evident that various modifications and combinations can be made thereto without departing from the invention. The specification and drawings are, accordingly, to be regarded simply as an illustration as defined by the appended claims, and are contemplated to cover any and all modifications, variations, combinations or equivalents that fall within the scope of those claims.

We claim:

1. A fault detection method executable by a controller is provided for detecting faults in a network cloud environment comprising:
   the controller transmitting a request to activate at least two scout functions at deployment locations in the network cloud environment, each scout function operable to execute one or more evaluation operations to collect and report evaluation information relating to its corresponding deployment location; and
   the controller receiving at least one evaluation report comprising an evaluation of computational or communication resource availability at the deployment locations;
   wherein each scout function is instantiated at its respective deployment location using a configuration associated with a network function of given specifications to enable a determination of the availability of sufficient computational or communication resources to allow for reliable operation of the network function.

2. The fault detection method of claim 1, wherein before the controller activates the at least two scout functions, the method further comprises the controller transmitting a request to instantiate and configure the at least two scout functions at the deployment locations.

3. The fault detection method of claim 1, wherein the at least one evaluation report further comprises an evaluation of communication resources between two or more scout functions.

4. The fault detection method of claim 1, wherein the at least one evaluation report is received by the controller either accessing a read port of the scout function or receiving a report transmitted by the scout function.

5. The fault detection method of claim 1, wherein the method further comprises:
   the controller transmitting an initiation request to instantiate and configure the network function at one of the deployment locations.

6. The fault detection method of claim 1, wherein the method further comprises deploying the network function in parallel with one of the at least two scout functions.

7. The fault detection method of claim 6, wherein the scout function comprises a scout function wrapper and the network function is deployed within a virtual environment provided by the scout function wrapper.

8. The fault detection method of claim 1, wherein the evaluation report further comprises an evaluation of communications transmitted by, or received from, the network function.

9. The fault detection method of claim 1, wherein after receipt of the at least one evaluation report the method further comprises:
   the controller transmitting to the scout function an instruction to execute a further evaluation function.

10. The fault detection method of claim 1, wherein the further evaluation function is more demanding of the network cloud environment than one or more evaluation operations.

11. The fault detection method claim 1, wherein all of the at least two scout functions comprises a same generic evaluation function configured to produce data upon which the evaluation information is based.

12. The fault detection method of claim 1, wherein at least one scout function includes at least one adjustable parameter operative to vary a corresponding functionality of that scout function.

13. The fault detection method of claim 12, wherein the at least one adjustable parameter is operative to vary one or more of:
    a resource measurement value;
    a communication delay threshold;
    a communication error rate;
    a set of one or more peer scout addresses;
    a computation measurement value;
    a report mode; and,
    a scout function duration value.

14. The fault detection method of claim 12, further comprising, following deployment of the at least one scout function, adjusting the at least one adjustable parameter of the at least one scout function to a predetermined value.

15. The fault detection method of claim 1, wherein at least one of the at least two scout functions comprises a customized scout function.

16. A controller operative to detect faults in a network cloud environment comprising:
    a network interface;
    a processor;
    a non-transitory memory for storing instructions that when executed by the processor cause the controller to be configured to:
    transmit, over the network interface, a request to activate at least two scout functions at deployment locations in the network cloud environment, each scout function operable to execute one or more evaluation operations to collect and report evaluation information relating to its corresponding deployment location; and, receive, over the network interface, at least one evaluation report comprising an evaluation of computational or communication resource availability at the deployment locations;

wherein each scout function is instantiated at its respective deployment location using a configuration associated with a network function of given specifications to enable a determination of the availability of sufficient computational or communication resources to allow for reliable operation of the network function.

17. The controller of claim 16, wherein before the controller activates the at least two scout functions, the controller is further operative to transmit a request to instantiate and configure the at least two scout functions at the deployment locations.

18. The controller of claim 16, wherein the at least one evaluation report further comprises an evaluation of communication resources between two or more scout functions.

19. The controller of claim 16, wherein the controller is further operative to receive the at least one evaluation report either by accessing a read port of the scout function or by receiving a report transmitted by the scout function.

20. The controller of claim 16, wherein the controller is further operative to transmit an initiation request to instantiate and configure the network function at one of the deployment locations.

21. The controller of claim 16, wherein the controller is further operative to deploy the network function in parallel with one of the at least two scout functions.

22. The controller of claim 21, wherein the scout function comprises a scout function wrapper and the network function is deployed within a virtual environment provided by the scout function wrapper.

23. The controller claim 16, wherein after receipt of the at least one evaluation report the wherein the controller is further operative to transmit to the scout function an instruction to execute a further evaluation function.

24. The controller of claim 23, further configured, following deployment of the at least one scout function, transmitting an instruction toward the at least one scout function to adjust the at least one adjustable parameter to a predetermined value.

25. The controller of claim 16, wherein at least one of the at least two scout functions includes at least one adjustable parameter operative to vary a corresponding functionality of that scout function.

26. The controller of claim 25 wherein the at least one adjustable parameter is operative to vary one or more of:
a resource measurement value;
a communication delay threshold;
a communication error rate;
a set of one or more peer scout addresses;
a computation measurement value;
a report mode; and,
a scout function duration value.

* * * * *